United States Patent [19]

Focke

[11] Patent Number: 5,129,209
[45] Date of Patent: Jul. 14, 1992

[54] APPARATUS FOR STABILIZING THE SHAPE OF CUBOIDAL (CIGARETTE) PACKS

[75] Inventor: Heinz Focke, Verden, Fed. Rep. of Germany

[73] Assignee: Focke & Co., Fed. Rep. of Germany

[21] Appl. No.: 639,445

[22] Filed: Jan. 10, 1991

[30] Foreign Application Priority Data

Jan. 12, 1990 [DE] Fed. Rep. of Germany ....... 4000685

[51] Int. Cl.$^5$ .............................................. B65B 51/6
[52] U.S. Cl. ..................... 53/136.1; 53/136.4; 53/233; 53/234; 53/575; 198/482.1
[58] Field of Search ............ 53/136.1, 136.4, 234, 53/233, 387.2, 575, 389.1; 156/483, 484, 485; 198/482.1

[56] References Cited

U.S. PATENT DOCUMENTS

| | | | |
|---|---|---|---|
| 3,236,026 | 2/1966 | Evans | 53/387.2 |
| 3,608,270 | 9/1971 | Rudszinat | 53/234 X |
| 3,978,639 | 9/1976 | Ferrozzi | 53/234 X |
| 4,620,891 | 11/1986 | Applegate | 53/136.1 |
| 4,636,186 | 1/1987 | Focke | 53/234 X |

FOREIGN PATENT DOCUMENTS

| | | | |
|---|---|---|---|
| 340526 | 11/1989 | European Pat. Off. | 53/234 |
| 1010907 | 7/1955 | Fed. Rep. of Germany | 53/234 |
| 2359032 | 2/1978 | France . | |
| 2409914 | 6/1979 | France . | |
| 2189429 | 10/1987 | United Kingdom . | |

Primary Examiner—John Sipos
Attorney, Agent, or Firm—Sughrue, Mion, Zinn, Macpeak & Seas

[57] ABSTRACT

In the production of packs with adhesively bonded folding tabs, especially of (soft) cup packs for cigarettes, it is necessary to keep the just finished packs for a while in an environment which preserves or improves their shape before they are discharged. For this purpose, an elongated pack channel (31) is provided, into which the finished packs (20) are pushed at one end (inserting opening 32) and which the packs leave after some time at the opposite end (discharge opening 33). The pack channel (31) has a cross-section which stabilizes or improves the cross-sectional shape of the pack (20). A plurality of pack channels (31) are mounted on a conveyor (channel conveyor 41) side-by-side. The packs (20) are inserted and ejected during a continuous transport of the endless channel conveyor (41). When the pack (20) enters a pack channel (31), a label (26) may be held ready which is folded round the forwardly pointing end face (23) of the pack (20) in a U-shaped manner by the insertion into the pack channel (31).

15 Claims, 10 Drawing Sheets

APPARATUS FOR STABILIZING THE SHAPE OF CUBOIDAL (CIGARETTE) PACKS

BACKGROUND OF THE INVENTION

The invention relates to an apparatus for shaping or stabilizing the shape of cuboidal (cigarette) packs, especially during the setting of glue of adhesively bonded folding tabs.

Packs made of paper or thin cardboard are usually designed such that folding tabs covering one another are connected to one another by adhesive bonding (glue). With packaging machines of particularly high performance, especially for a cigarette packs, it is often not possible to guarantee a sufficient setting of glue areas because of the short cycles. This is the reason why these sort of packaging machines are equipped with separate drying turrets which hold a large number of finished but not yet dried packs (e.g. DE-A-26 32 968). Said drying turrets also have the function of preserving or stabilizing the (cuboidal) shape of the pack.

Drying turrets of the abovementioned kind are complicated in structure and handling. Moreover, the capacity for the packs to be treated is not sufficient for machines of particularly high performance. Notwithstanding the high output, it is still desirable that the packs remain in a shaping unit for a sufficient amount of time to allow the glue areas to set.

SUMMARY OF THE INVENTION

Setting out from this problem, the invention is based on the object to further develop the apparatus mentioned above, such that packs, especially cuboidal (cigarette) packs, are held in a shaping or shape-stabilizing holder for an optimum amount of time.

To attain this object, the apparatus as taught by the invention is characterized in that elongate channel-like pack holders are arranged on an endless conveyor axis-parallel to one another, said pack holders being open at both ends and having a length being several times the length of one pack, said packs being insertable in the region of an inserting station via an inserting opening into the pack holder, thereby shifting the packs already held in the pack holder, such that at the opposite end at a discharge opening, one pack at a time can be ejected from the pack holder.

According to the invention, the pack holder is designed as a pack channel with a cross-section corresponding to the cross-section of the pack, be it rectangular or of any other shape. The packs are pushed into the pack channels at one end during the preferably continuous transport of the pack holders (pack channels) by the endless conveyor. By inserting a pack into the pack channel, a pack, having the proper shape and set glue areas, at the same time leaves the pack channel at the opposite end.

The axial length of the pack channel and the size of the endless conveyor determine the capacity of the apparatus for holding packs during the shaping and stabilizing process. If the endless conveyor is driven continuously, the performance can be even further increased.

The apparatus as taught by the invention also solves another problem occurring in the production or finishing of packs, especially cigarette packs. Cigarette packs are often provided with a revenue stamp or a closing strip which is transversely placed across an end face of the pack, with legs extending in the region of adjoining front and rear walls.

According to the invention, packs can be successively conveyed in a tightly arranged row through a mouthpiece, such that while the end face of the pack is taking over the label and thereafter, the label held ready in the region of the mouthpiece abuts a bottom face, located opposite said end face, of a pack lying in front of the other pack in the conveying direction, such that said label is fixed in position between end face and bottom face of two adjacent packs. The mouthpiece may be designed in different ways, preferably as the inserting opening of a pack channel as taught by the present invention.

According to the invention, the labels are in this process fixed in place by suction bores at the end faces of the pack channels and are pulled thereof in a slipping manner. The suction bores are centrally disposed in the region of top and bottom wall. The suction bores are provided with a vacuum by a central distributing means running in synchronism with the circularly running pack channels.

According to a further feature of the invention, the label is, in the case of a continuously operating apparatus, continuously fed to the endless conveyor for the pack channels and held ready in front of the entrance (inserting opening), running in synchronism therewith.

Further features of the invention relate to the design of the pack channels, their connection to the endless conveyor, the design of a pack conveyor and to means for feeding and holding ready the label or the like.

BRIEF DESCRIPTION OF THE DRAWINGS

Exemplary embodiments of the invention will be described below in more detail with reference to the drawings, in a which.

DESCRIPTION OF PREFERRED EMBODIMENTS

Figure 1:
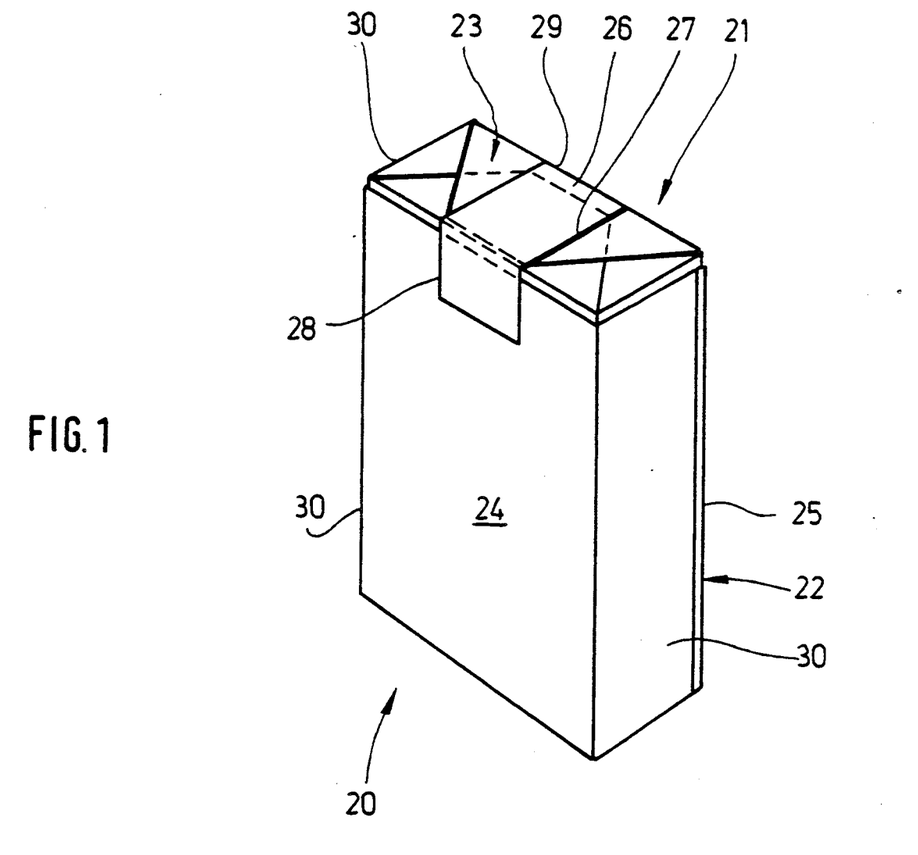
FIG. 1 is a perspective view of a pack, namely a soft cup pack for cigarettes.

The exemplary embodiment of the apparatus which is shown in the drawings is particularly suitable for the treatment of cuboidal packs 20 of the soft cup type for accommodating cigarettes. Packs 20 of this type consist of an inner wrapping—usually of tin foil—for a cigarette group. The inner wrapping surrounds the cigarette group on all sides and thus forms a cigarette block 21. An outer wrapping is usually made of paper and is formed as a cup 22, i.e. it is open at the top. The cigarette block 21 slightly projects from the cup 22 at the top side.

The pack designed in this way comprises, amongst others, an (upper) end face 23 and adjoining rectangular faces located opposite to one another, namely front side 24 and rear side 25, so that the pack has an overall cuboidal shape. An adhesively affixed strip of material or blank extends across the end face 23, namely a (revenue) label 26. This label 26 rests with a central portion 27 on the end face 23. Legs 28, 29 extend in the region of front side 24 and rear side 25.

The pack 20 has several adhesive bonds, specifically in the region of folding tabs covering one another. In particular, the cup 22 is provided with adhesively bonded folding tabs which are formed in the region of a bottom (opposite the s end face 23) and/or in the region of a side face 30 or two oppositely situated side faces 30.

It is an important task of the apparatus to guarantee a setting of the glue areas of the pack 20 while the cuboidal contour is preserved or stabilized at the same time.

Figure 6:
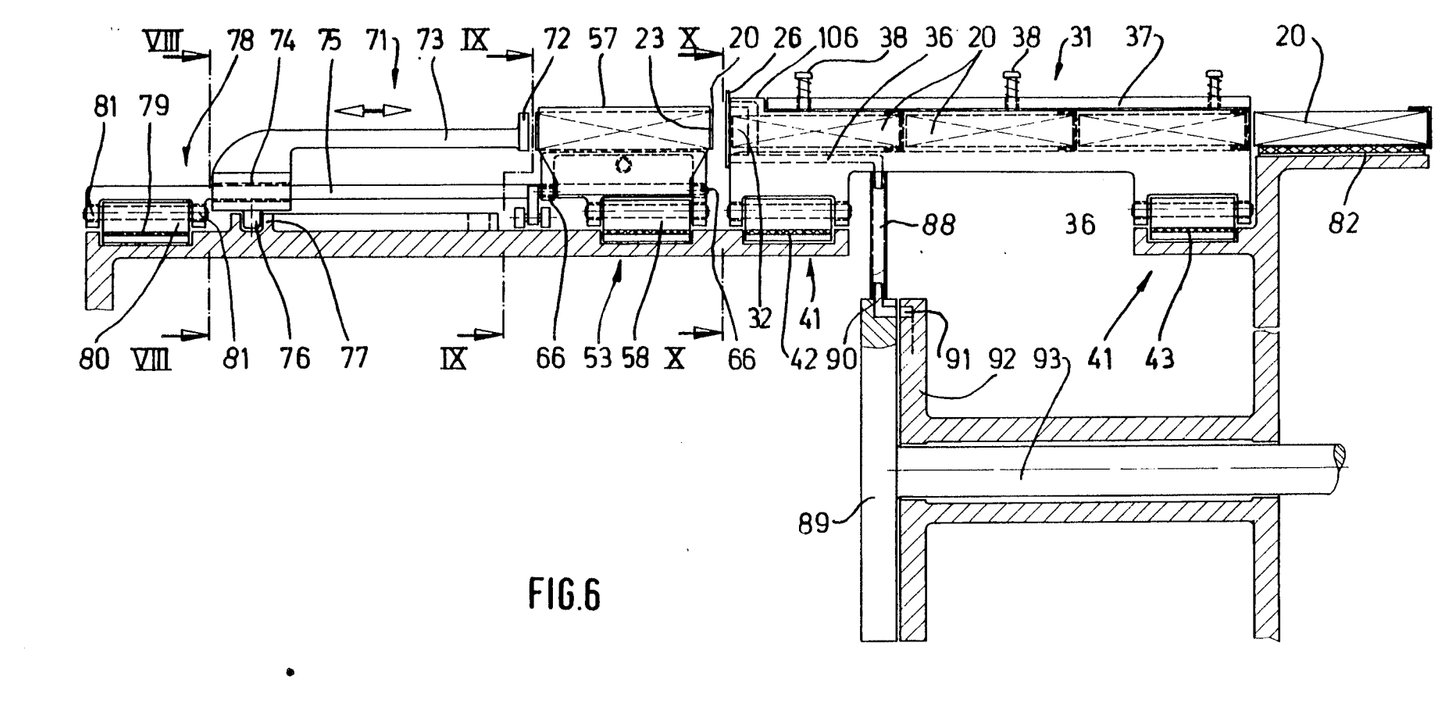
FIG. 6 is a cross-section of the apparatus according to FIG. 2, taken along the line VI—VI.
Figure 7:
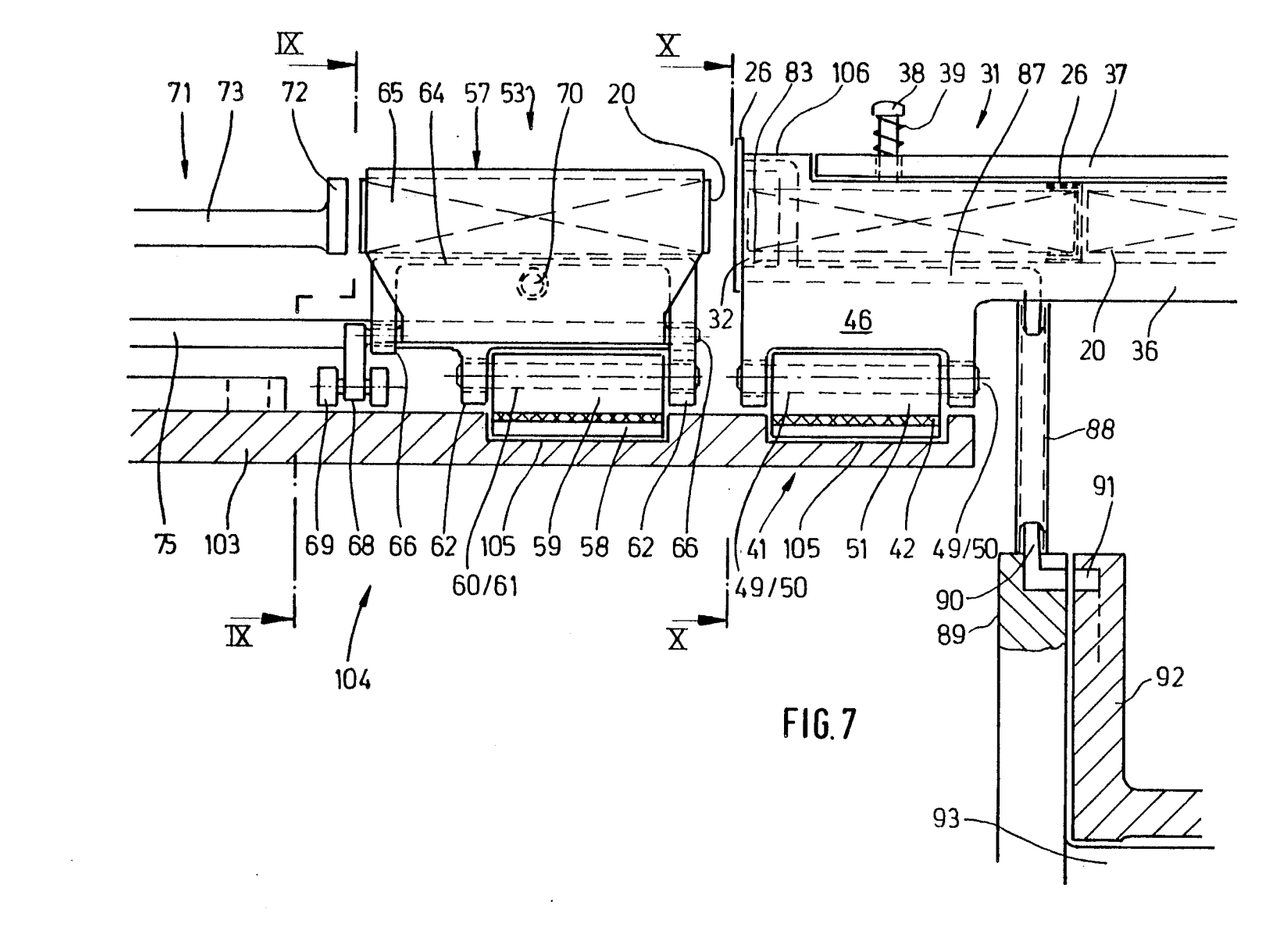
FIG. 7 shows a (central) section of the representation according to FIG. 6.

For this purpose, the packs 20 are inserted into holders or pockets immediately after production, i.e. with "fresh" glue areas. These holders or pockets correspond to the (cross-sectional) shape of the packs 20 and thus surround the latter in a form-fitting positive manner. In the a present embodiment, the apparatus is equipped with elongated shell-like holders for the packs 20, namely with pack channels 31, each for receiving a plurality of packs 20—in the shown embodiment (FIG. 6) three packs 20. The pack channels 31 are open at both ends, so that the packs 20 can be inserted at the one end, namely via an inserting opening 32, into the pack channel 31 in the longitudinal direction thereof. At the opposite end, the inserting process causes a pack 20 to leave the pack channel 31 via a discharge opening 33 at the same time.

The packs 20 are pushed into the pack channel 31 with the end face 23 pointing ahead. The pack channel 31 has a free inner cross-section corresponding to the (smaller) cross-section of the pack 20. The side faces 30 of the pack 20 rest against side walls 34 of the pack channel 31. The end faces 23 bear against bottom faces 35 of adjacent packs 20 within the pack channel 31.

Figure 11:
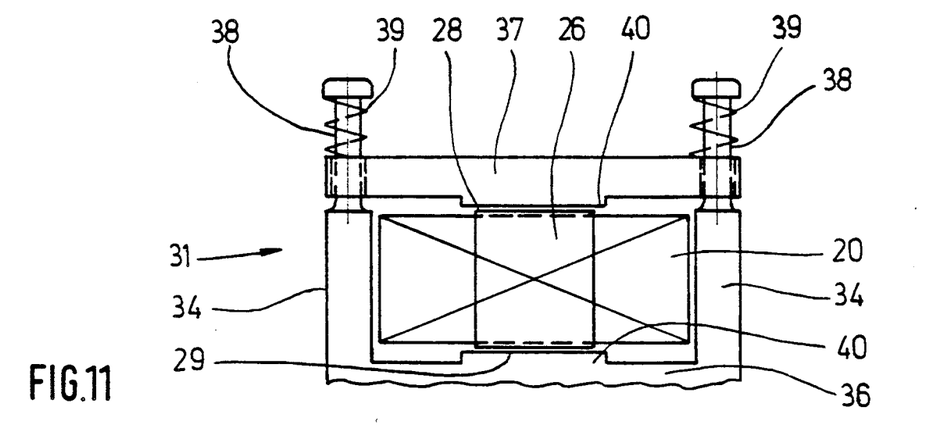
FIG. 11 shows an upper region of a pack channel seen from the ejection end.

An advantageous embodiment of a cross-sectional design of a the pack channel 31 follows in particular from FIG. 11. Accordingly, a bottom wall 36 forms a unit with the side walls 34, namely a profile having a U-shaped cross-section. A top wall 37 is formed as a separate element and is movably connected to the side walls 34. The latter is for this purpose provided with (upright) supporting bolts 38, on which the top wall 37 is shiftably mounted with respective bores. The top wall 37 is pressed against the upwardly facing side of the pack 20 with elastic pressure, in the present case by means of pressure springs 39 arranged on the supporting bolts 38. As a result, a form-shaping pressure is applied to the packs 20 in the pack channel 31.

Bottom wall 36 and top wall 37 do not abut the packs 20 with their full surface, but with ridge-like elevations 40. These extend in the central region of the pack channel 31, with a width being greater than that of the (likewise central) label 26.

Figure 2:
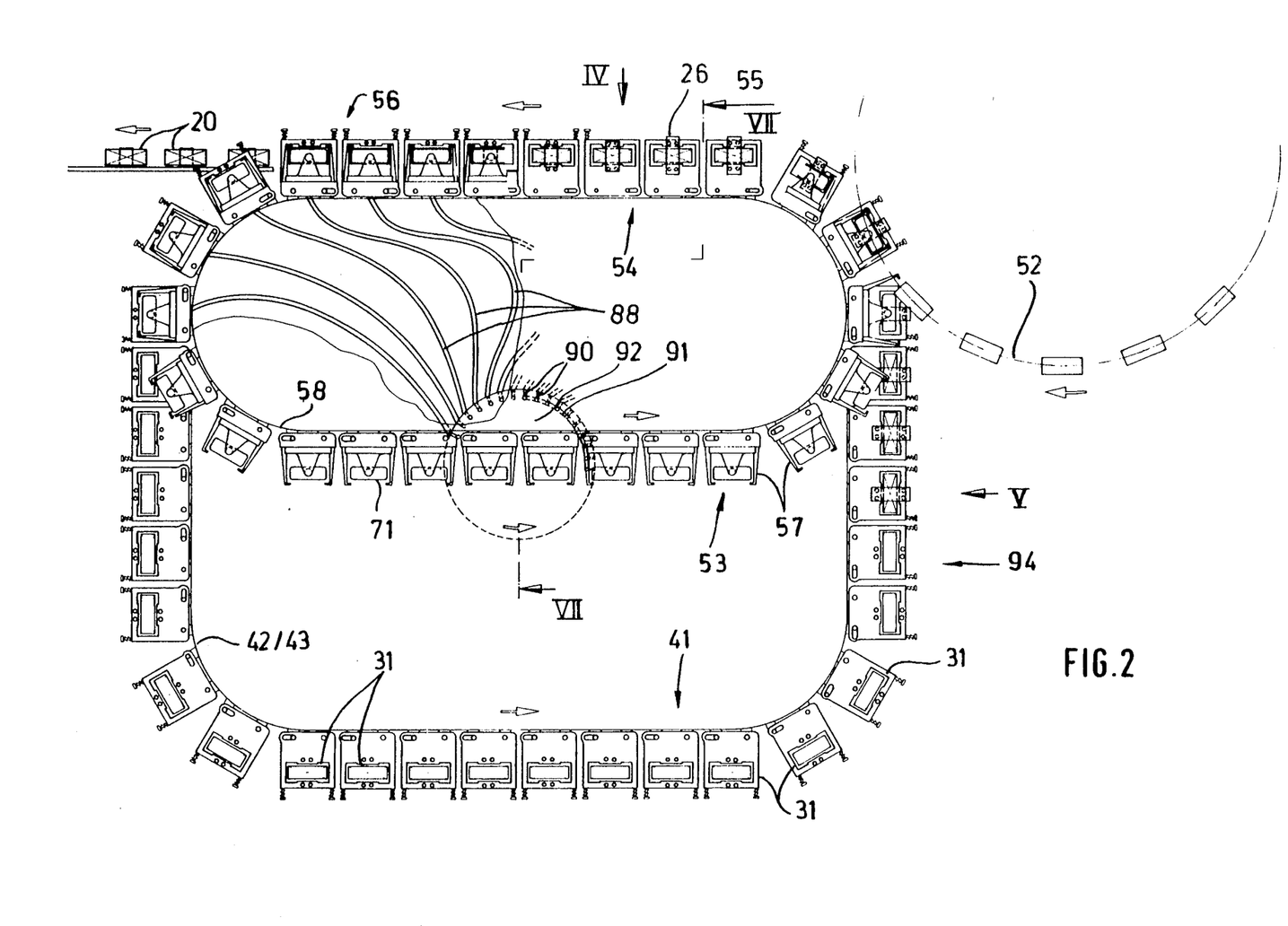
FIG. 2 shows a general side view of the apparatus for treating packs.

A plurality of such pack channels is arranged on an endless conveyor side-by-side in parallel alignment and slightly spaced apart. In the present embodiment, the endless conveyor runs over several deflecting rollers (not shown), in this case over four deflecting rollers. The contour of a channel conveyor 41 with pack channels 31 oriented transverse to the moving direction is shown in FIG. 2.

To form the endless conveyor with the pack channels 31, the latter are mounted on two band or belt conveyors spaced apart from one another, in the present case on toothed belts 42, 43.

For being affixed to the toothed belts 42, 43, the pack channels 31 are provided on their bottom side with connecting walls 46. The latter have a bore 47 and, located at a distance therefrom, a long hole 48. Ends of bearing bolts 49, 50, which are firmly connected with the toothed belts 42, 43, enter the long hole 48 and the bore 47 of the a connecting straps 46. The bearing bolts 49, 50 are anchored in bead-like projections 51 disposed on the upper side of the toothed belts 42, 43 facing towards the pack channels 31 by being embedded therein.

Figure 3:
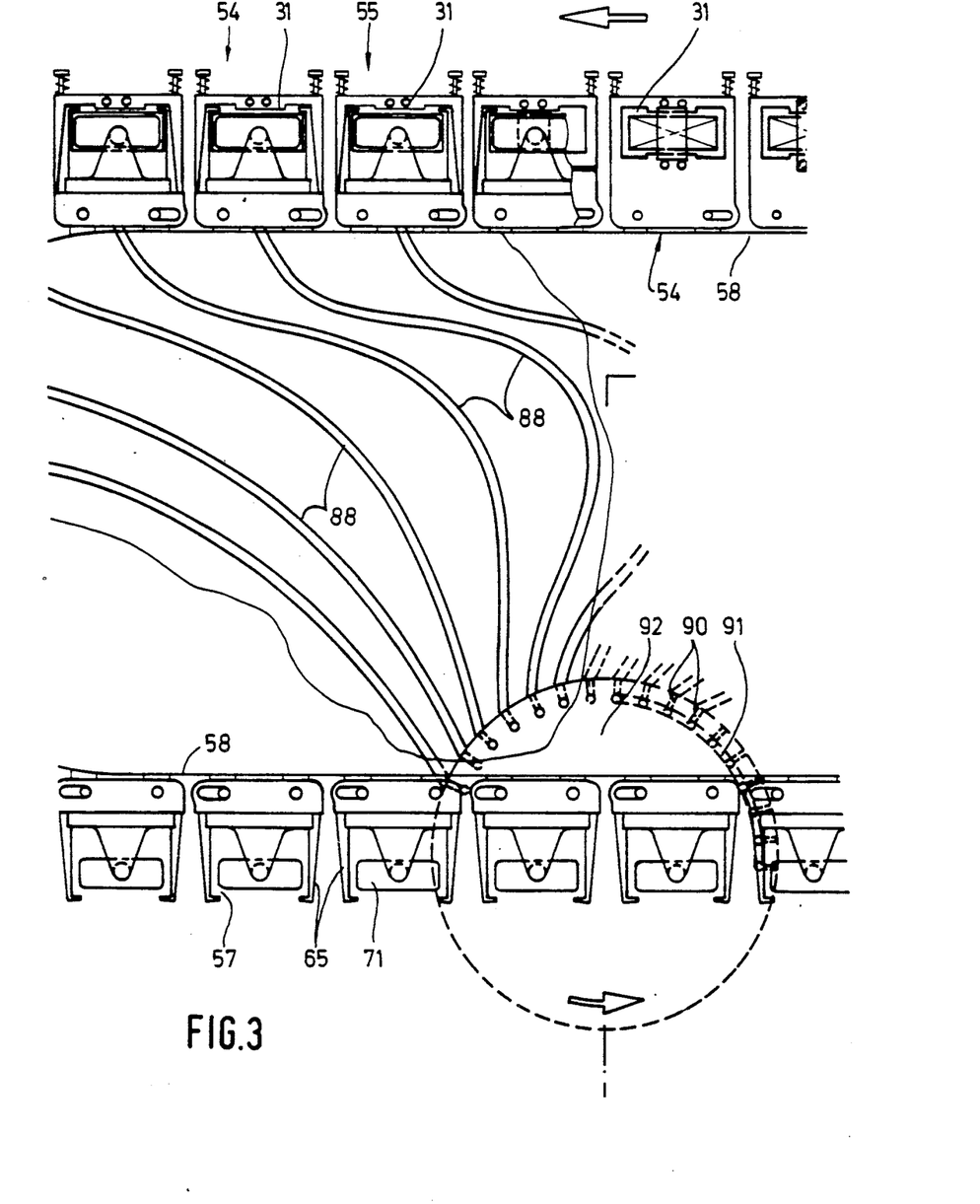
FIG. 3 shows a detail of the apparatus according to FIG. 2, on an enlarged scale.
Figure 4:
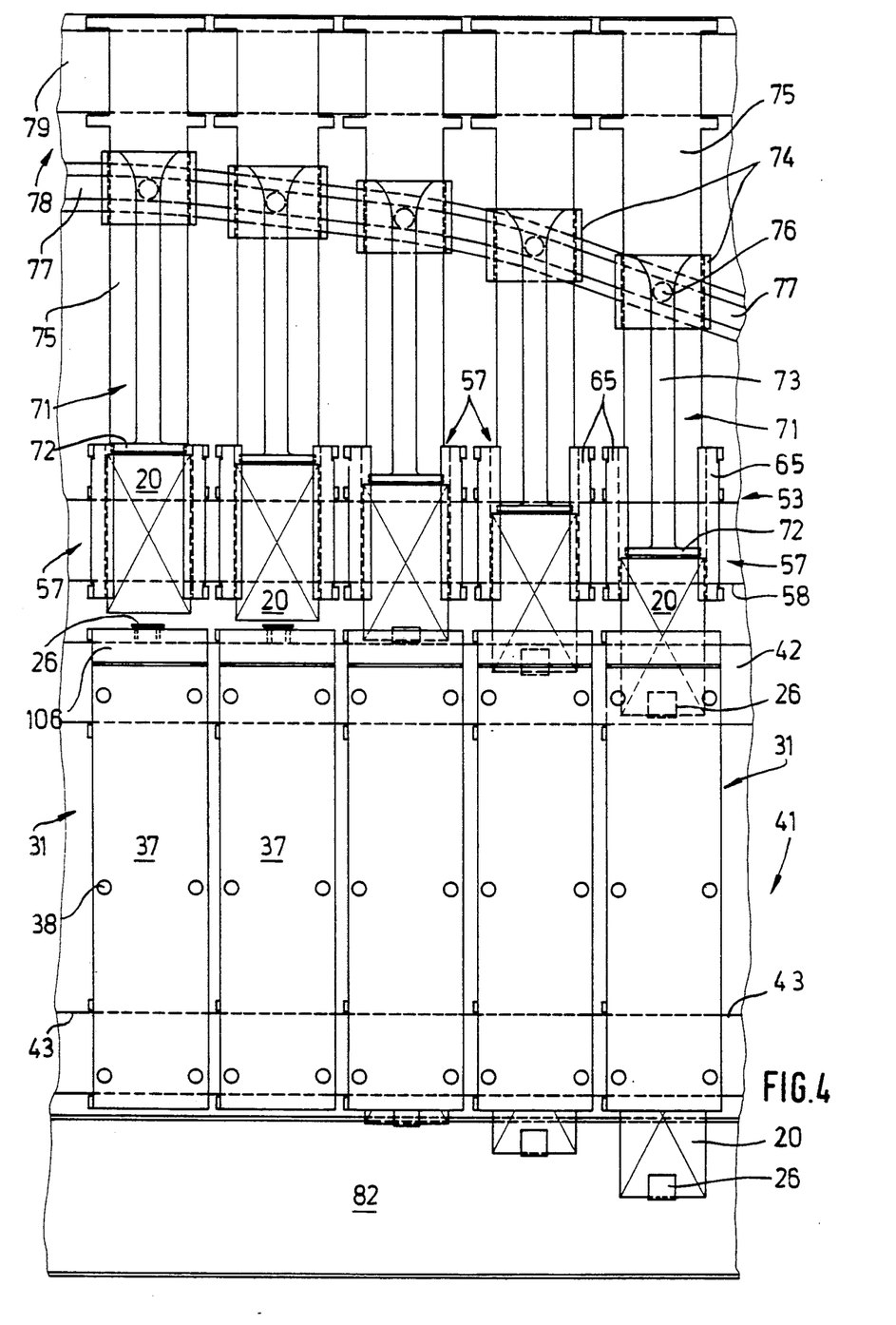
FIG. 4 shows a detail of the apparatus in (top) plan view, as indicated by arrow IV.
Figure 5:
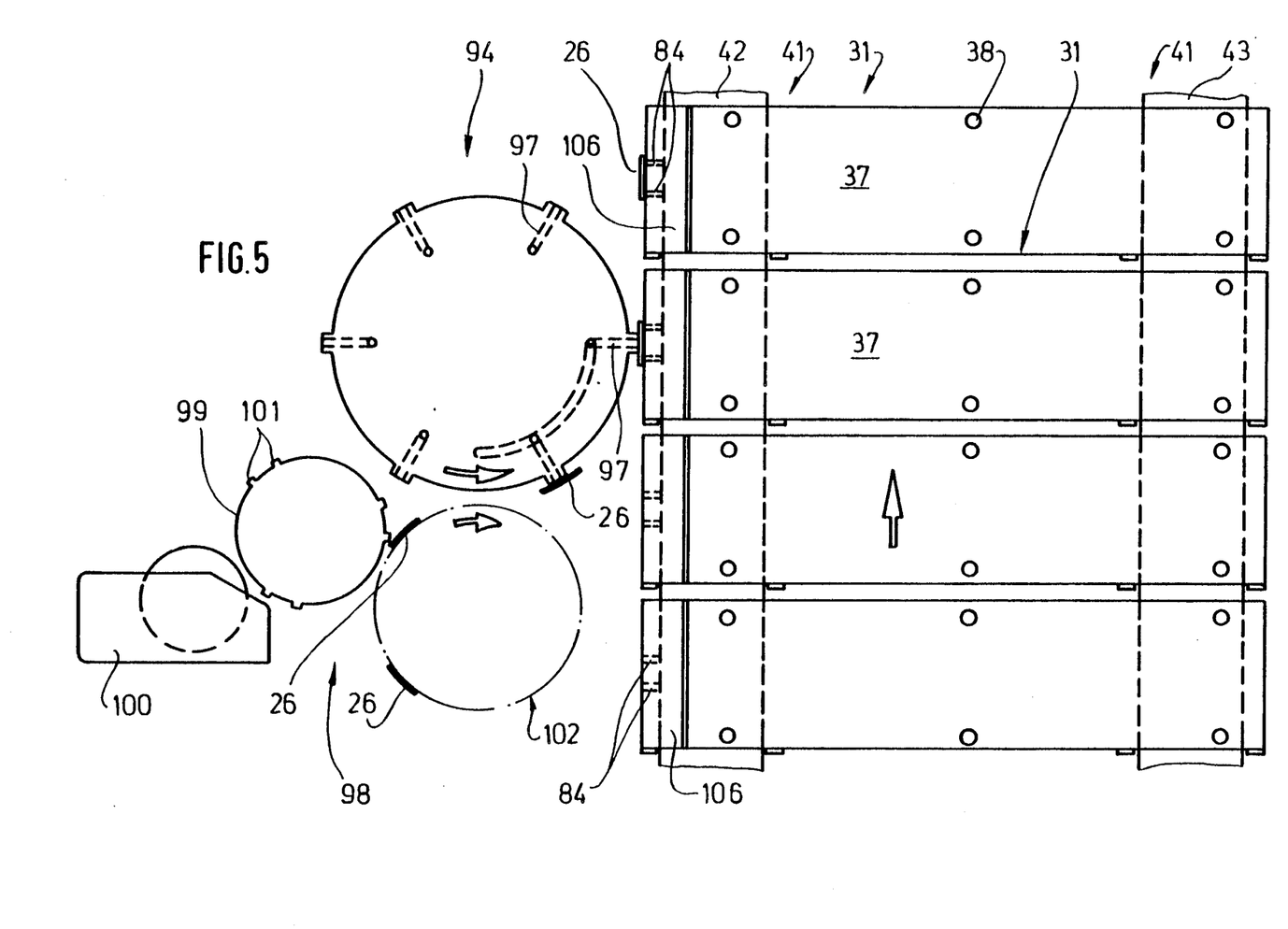
FIG. 5 shows another detail of the apparatus according to FIG. 2, in the region where labels are supplied, in a side view as indicated by arrow V.

The mounting of one of the bearing bolts in a long hole 48 allows for relative movements (see for instance FIG. 3) which result from the deflection of the toothed belts 42. 43 in the region of the deflecting rollers (not shown).

The ready-folded packs 20, being adhesively bonded in the region of the folding tabs, are directly supplied from a folding turret 52 (or an accordingly designed intermediate conveyor). The packs 20 are then taken over by a pack conveyor 53, which in this case is also designed as an endless conveyor. The pack conveyor 53 extends in a plane offset relative to the channel conveyor 41. An upper conveying strand 54 of the pack conveyor 53 and a receiving strand 55 being in this embodiment of the same length run in synchronism with one another along a sufficiently long conveying track. This track is a transfer track 56 in which the packs 20 are transferred from the pack conveyor 53 to the channel conveyor 41. This transfer of packs from one conveyor to another is conducted while both conveyors 41 and 53 are continuously moving without any interruptions.

The pack conveyor 53 is provided with pockets 57 arranged closely side-by-side for holding one pack each. The pockets are disposed on an elastic endless conveyor, namely a toothed belt 58. The latter is provided, in analogy to the embodiment shown in FIG. 11, with two projections 59 being spaced apart and affixed on the top side. Bearing bolts 60, 61 penetrate these projections 59. Webs 62 bear against the ends of these bolts, specifically against the bearing bolt 61 with a long hole 63. These webs 62 form part of a pocket bottom 64, on which the pack 20 rests. The pack 20 is laterally limited, namely in the region of the narrow side faces 30, by movable pocket walls 65. These walls 65 are designed with appropriate extensions as two-armed pivotable levers and are each pivotable about a pivot bearing 66. The free upper edges of the pocket walls 65 are formed with transverse holding legs 67, so that the packs 20 are embraced in a hook-like manner at their upper or outer side.

In order to receive a pack 20 from the folding turret 52, the pockets 57 are opened at the radially outer side by moving the pocket walls 65 apart. For this purpose, actuating means 68 in the region of the opening of the pockets 57 are appropriately actuated. Supporting rollers 69 are disposed at the ends of the actuating arms 68. These rollers 69 run up on appropriately designed curved paths (not shown), so that the pocket walls 65 are moved into the open position via the curved actuating arms 68. The pocket walls 65 are constantly loaded in direction of the closed position by a tension spring 70 connecting the oppositely situated pocket walls 65.

Figure 8:
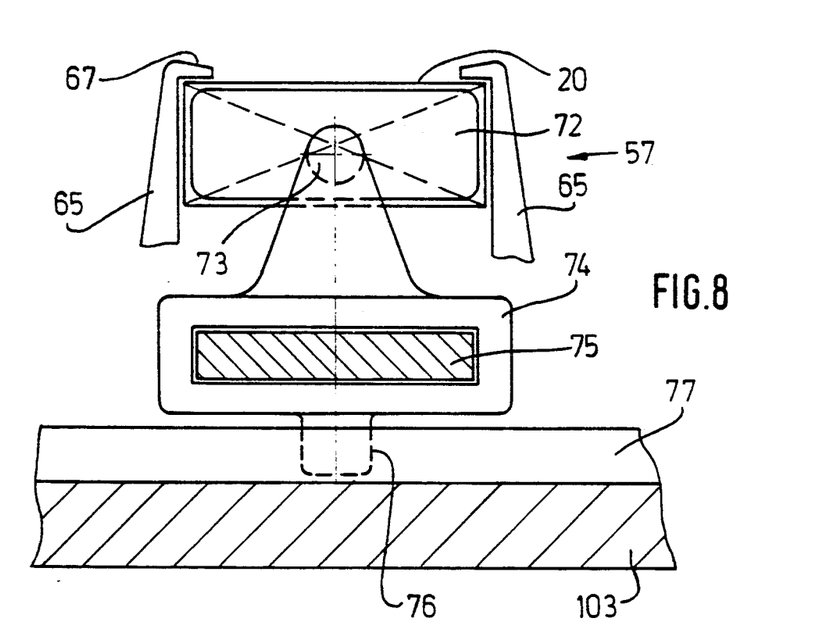
FIG. 8 shows a cross-section taken along the line VIII—VIII of FIG. 6.
Figure 9:
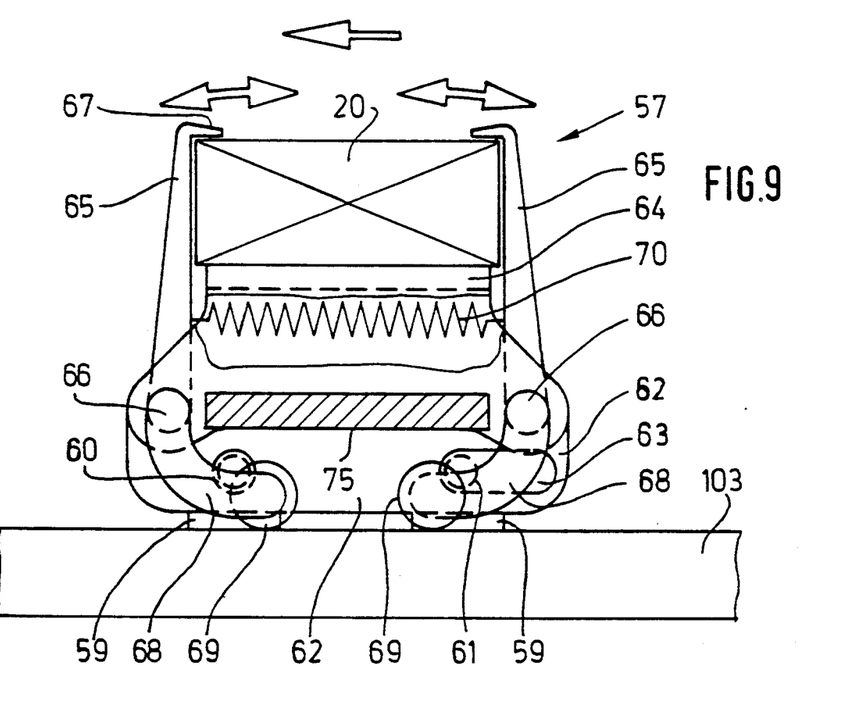
FIG. 9 shows a cross-section taken along the line IX—IX of FIG. 6.
Figure 10:
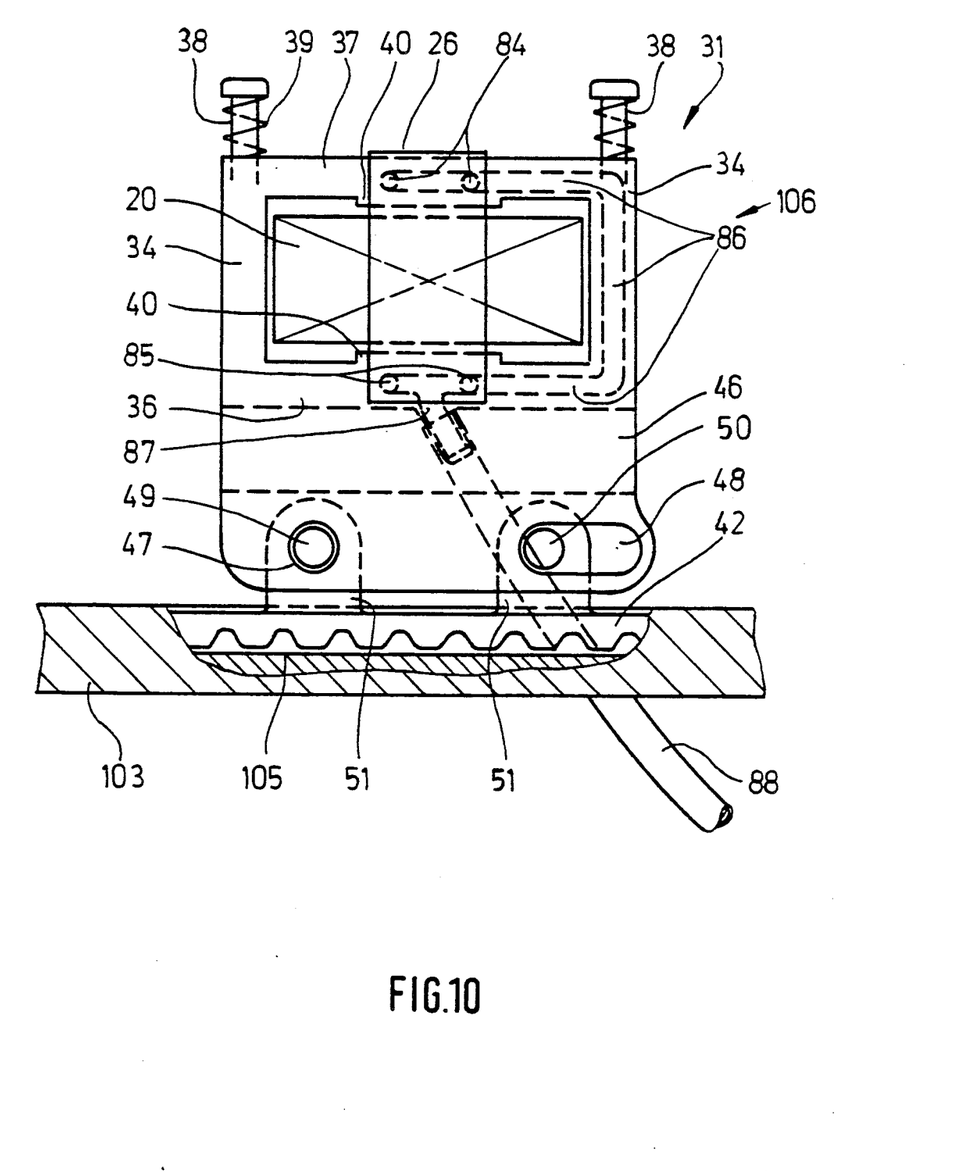
FIG. 10 shows a cross-section taken along the line X—X of FIG. 6.

In closed position of the pockets 67 (FIGS. 8 and 9), the pocket walls 65 are arranged such that the packs 20 can be pushed out of the pockets 57 being open at both ends in the longitudinal direction. For this purpose, each pocket 57 is associated with a slide 71, which continuously circulates with the associated pocket 57. The slide 71 consists of a slide plate 72, which engages the bottom face 35 of the pack 20. An elongated slide rod 73 is connected to a sliding member 74 which is shiftably mounted on a traverse 75. The latter extends parallel to the path of movement of the slide 71, i.e. horizontally.

The slide 71 is automatically controlled, specifically in accordance with the conveying movement of the pocket 57 in the region of the transfer track 56. For this purpose, a guide pin 76 is arranged on the sliding member 74, said pin 76 engaging a stationary cam groove 77. This cam groove 77 is designed such that, with a continuous conveying movement of the pocket 57 with the slide 71, the slide 71 conducts the pushing-out movement, such that the pack 20 is moved from the pocket 57 into a directly opposite pack channel 31 of the channel conveyor 41. Thereafter, the slide 71 returns to the starting position.

The pack conveyor 53 is connected with a separate slide conveyor 78 to form a conveying unit. A further endless conveyor, namely a toothed belt 79, extends at a distance from the pack conveyor 53, that is to say the toothed belt 58 thereof. This toothed belt 79 is designed similarly to the already described exemplary toothed belt embodiments. At the top side of this toothed belt 79 there are projections in which bearing bolts 80 are held. Webs 81 connected to the traverse 75 bear against and are attached to the ends of said bolts. Thus, the free end of the traverses 75 facing away from the pack conveyor 53 is connected to the toothed belt 79. The other end is connected to the pocket 57 and therewith to the toothed belt 58 of the pack conveyor 53. The unit formed herewith, with two toothed belts 58, 79, is moved continuously, in synchronism with the channel conveyor 41.

By pushing a pack 20 with the slide 71 into the pack channel 31, a pack 20 is simultaneously pushed out the pack channel 31 via the discharge opening 33. Each pack 20 has by then circulated several times with the pack conveyor 41 and has spent a respective amount of time in the pack channel 31, while being pushed forward in steps towards the discharge opening 33. The ready-set packs 20 are moved onto a discharge conveyor 82 extending immediately adjacent to the discharge opening 33.

In the shown embodiment, the pack 20 is provided with the label 26 in the region of the end face 23. This label 26 is held ready at the inserting opening 32 in front of each pack channel 31, so that the label 26 folds around the end face 23 and adjoining pack faces in a U-shaped manner when the pack 20 is pushed into the pack channel 31. The pack channels 31 are provided with bevels 83 in the region of the inserting opening 32 at the bottom wall 36 and the top wall 37.

Here, the inserting opening 32 acts as a mouthpiece which may also be designed in a different way. In particular, said mouthpiece does not have to be part of a pack channel. It is important though, that several packs 20 are successively transported in a tight arrangement, the end face 23 and the bottom face 35 of adjacent packs 20 abutting and supporting one another. The label 26 is therewith additionally fixed in position between the aforesaid pack faces of adjacent packs, so that undesirable changes of position are avoided until the adhesive bonds of the label 26 have set.

The label 26 is held ready in the region of the transfer track 56 in an upright position in front of the inserting opening 32. The label 26 abuts the end face of the pack channel 31, specifically the bottom wall 36 on the one hand and the top wall 37 on the other hand, in central position relative to the inserting opening 32.

For (releasably) fixing and positioning the label 26 in this position, suction bores 84, 85 open out into the end faces of bottom wall 36 and top wall 37 in the region of the label 26. In the present example, two suction bores 84, 85 being spaced apart from one another are provided in each case. These suction bores 84, 85 are connected to suction conduits 86 extending in the region of top wall 37, side wall 34 and bottom wall 36 of the pack channel 31. In the longitudinal direction thereof, a connecting conduit 87 extends in the bottom wall 36. This connecting conduit 87 leads out of the bottom wall 36 and is connected to a flexible vacuum line 88, i.e. a hose.

In the shown embodiment, the pack channels 31 are designed in the region of the inserting opening 32 as a cross-sectionally closed and rigid mouthpiece 106. In the region of this mouthpiece 106, there are located the suction conduits 86. The movable part of the upper wall 37 extends from this mouthpiece 106. The rigid mouthpiece 106 ensures a particularly accurate shaping of the pack 20 when the latter is pushed in. Furthermore, the label 26 is pressed to and folded round the pack 20 with particular accuracy.

The suction air, that is to say the vacuum, is distributed by a central common vacuum means. Said vacuum means in this case consists of a suction disc 89 with suction connections 90 opening out into the radially outer face thereof. The vacuum lines 88 are connected to these suction connections 90. In their turn, the suction connections 90 are in connection with a distributing segment 91 in the region of a side face of the suction disc 89. This distributing segment 91 is formed as an open groove in a fixed distributing disc 92. The distributing segment 91 is connected to a vacuum source in an appropriate way.

The suction disc 89 is mounted on a rotatingly driven shaft 93 and is driven in synchronism with the (continuous) conveying movement of the pack channels 31. The suction disc 89 is arranged centrally within the region enclosed by the channel conveyor 41, as can be particularly seen from FIG. 2. As a result of the design of the channel conveyor (deflected via four deflecting rollers), there are varying distances which are compensated by respective lengths of the deformable vacuum lines 88. The distributing segment 91 serving for transferring the vacuum extends in a portion of the periphery of the suction disc 89, such that a vacuum is generated in the region of the suction bores 84, 85 along a section of the transfer track 56. After the label 26 has been taken along by a pack 20, the suction air in the region of the suction bores 84, 85 is cut off.

The labels 26 are fed to the pack channels 31 by a separate label conveyor 94, which in this case is designed as a label drum which is driven to continuously rotate, specifically in synchronism with the pack channels 31.

The label conveyor 94 is located in the region of an ups right conveying track of the channel conveyor 41, namely in the region of a conveying strand 95. The label conveyor 94 is arranged in front of the end faces of the pack channels 31 which are receiving the labels 26. The relative position is such, that the peripheral surface of the label drum leads up to the end faces of the pack channels 31, specifically in the region of bottom wall 36 and top wall 37.

In the present embodiment, the drum-like label conveyor 94 is provided with radially projecting rib-like label carriers 96. The labels 26 rest on these label carriers 96 with a central strip-like portion. Suction bores 97 open out into the free contact surface of the label carriers 96 for holding the labels. When the labels are transferred to the pack channel 31, the suction bores 97 are ventilated.

The label conveyor 94 is associated with a gluing unit 98, with which lateral glue surfaces or strips are applied to the edge portions of the labels 26 in order to connect the latter with the pack 20. The gluing unit 98 is provided with a drum-like glue-applying means 99, which takes glue from a glue container 100 in a strip-like manner. The glue-applying means 99 contains rib-like radial projections 101 having glue on their outer sides. The projections 101 are arranged in pairs and spaced apart from one another at a distance which corresponds to the arrangement of glue strips on a label 26. These labels are moved past the glue-applying means 99 on a conveyor roller 102, such that the glue strips are therewith transferred from the projections 101 to the outwardly facing side of the label 26. In this process, the labels are held on the conveyor roller 102 by means of suction air. Subsequently, the labels 26 provided with lateral glue strips are transferred to the label conveyor 24, that is to say each label to a label carrier 96 thereof. The label 26 rests on the label carrier 96 with a portion located between the glue strips.

When the label 26 is transferred to a pack channel 31, the glue strips are located on the outer side, so that they are facing towards the pack 20.

The parallel extending conveyors which convey the means associated therewith, i.e. toothed belts 42, 43 and 58, 79, are mounted on a commen supporting means. This supporting means is a continuous machine plate 103 being part of a machine frame 104. In the region of the toothed belts, indentations 105 are formed in the machine plate 103 so that said toothed belts can run therein.

The apparatus is also suitable for the processing of such packs which are not to be provided with a label 26. In this case, the means necessary for the supply and transfer of the label are missing.

What is claimed is:

1. In an apparatus for shaping or stabilizing the shape of cuboidal packs in conjunction with the setting of glue of adhesively bonded folding tabs, wherein said apparatus comprises a plurality of elongated channel-like pack holders through which the packs are conveyed in a forward conveying direction, which are open at both ends, which have a cross-section which corresponds to that of the packs (20), which have a longitudinal length that is several times longer than the length of a pack (20), and which are disposed axis-parallel to one another on an endless conveyor, and wherein said packs (20) are insertable into one end of each pack holder via an inserting opening (32), thereby shifting in said forward conveying direction packs (20) already in said pack holder so that, at an opposite end thereof, one pack (20) at a time is ejected from said pack holder via a discharge opening 33 at said opposite end, the improvement wherein:

each pack holder comprises a plurality of elongated pack channels (31), each of which has a cross-section corresponding to the rectangular cross-section of at least a top end face (23) of a cuboidal pack (20), and in each of which each pack is directed with its longitudinal axis in the longitudinal forward conveying direction of the pack channel (31), with said top end face (23) of each pack being pointed in said forward conveying direction; and wherein said apparatus further comprises:

an endless channel conveyor (41) for continuously circulating said pack channels (31) while both a new pack (20) is being inserted into the inserting opening (32) of a pack channel (31) and also a downstream pack is being ejected from the opposite end of the pack channel (31) in a region of a pack-transfer track (56);

a pack conveyor (53) for continuously transporting the packs in synchronism with the circulating pack channels (31), in a cross-axial direction and in alignment with the inserting openings (32) of the pack channels (31), such that the packs are inserted into associated pack channels (31) in the longitudinal conveying direction without any interruption of movement of either said channel conveyor (41) or said pack conveyor (53); and means, continuously moving in synchronism with the circulating pack channels (31), for inserting packs into and removing packs from said pack channels.

2. The apparatus as claimed in claim 1, wherein said channel conveyor (41) is a belt conveyor comprising two spaced and parallel toothed conveyor belts (42, 43) to which side-by-side pack channels (31) are attached.

3. The apparatus as claimed in claim 1 or 2, wherein said means comprises means for pushing the packs out of the pack conveyor (53) and into the pack channels (31) along a rectilinear common parallel conveyor track (56) of the pack conveyor (53) and the channel conveyor (41).

4. The apparatus as claimed in claim 1, further comprising: for each pack channel (31), a slide (71) which is movable in the longitudinal direction of the pack channels (31) and which is conveyed in synchronism therewith; and a separate slide conveyor (78) on which the slides (71) are mounted, said slides (71) being movable in the longitudinal direction during conveyance by said slide conveyor (78) in order to push one pack (20) at a time into a pack channel (31).

5. The apparatus as claimed in claim 4, wherein the pack conveyor (53) comprises an endless conveyor (58) with pockets (57) for holding one pack (20) each, wherein the pockets (57) are aligned with the pack channels, and wherein the slides (71) simultaneously serve both for pushing packs (20) out of the pockets (57) and also for pushing the packs into the pack channels (31).

6. The apparatus as claimed in claim 4, further comprising: a holding device (75) on which the slides (71) are mounted by means of a sliding member (74) and which extends parallel to the direction of movement of the slides (71); and a guide pin (76), which is attached to said sliding member (74) and which engages a stationary cam groove (77), for imparting movement to said slides.

7. The apparatus as claimed in claim 6, wherein the holding device (75) is connected, on the one hand, to the slide conveyor (78, 79), and, on the other hand, to the pack conveyor (53, 58).

8. The apparatus as claimed in claim 5, wherein each slide inserts the packs (20) into the pockets (57) of the pack conveyor (53) in the radial direction and ejects the packs therefrom in the axial direction.

9. The apparatus as claimed in claim 8, wherein each of the pockets (57) comprises: a pocket bottom (64) for the packs (20) to rest on; and transversely pivotable, lateral pocket walls (65) which are movable away from one another in order to receive a pack (20).

10. The apparatus as claimed in claim 1, wherein each of the pack channels (31) has a movable top wall (37) which is movable to abut a front side (24) or rear side (25) of the pack (20), said movable top wall being elastically loaded in the direction of abutment with the pack (20).

11. The apparatus as claimed in claim 10, wherein a bottom wall (36) and side walls (34) of each pack channel (31) form a single-piece workpiece having a U-shaped cross-section, the top wall (37) being movably mounted on upper edges of said side walls (34).

12. The apparatus as claimed in claim 1, further comprising fixing means for holding a strip-like label (26) ready in front of each inserting opening (32) of the pack channels (31), such that the label is folded in a U-shaped manner around an end face (23) and adjoining pack faces of a pack (20) when a pack (20) is pushed into a pack channel (31).

13. The apparatus as claimed in claim 12, wherein said fixing means fixes a label (26) to a pack channel (31) and comprises: suction bores (84, 85) opening out into the end face of the pack channel (31) in the region of a bottom wall (36) and a top wall (37) thereof; and suction and connecting conduits (86, 87) which are connected to the suction bores (84, 84) and which are linked via flexible vacuum lines (88) to a common distributing means (89) which is movable in synchronism with the pack channels (31).

14. The apparatus as claimed in claim 10, wherein the pack channel (31) has a portion which faces towards the inserting opening (32), which is cross-sectionally closed and which forms a rigid mouthpiece (106) having the cross-section of the pack (20).

15. The apparatus as claimed in claim 12, further comprising a label conveyor (94) for feeding labels (26) to said opposite ends of the pack channels (31), said label conveyor (94) conveying in the direction of movement of the pack channels (31) and being in the form of a drum on whose periphery the labels (26) are fixed by means of suction air.

* * * * *